T. C. Moore,
Sad Iron,

N° 60,775. Patented Jan. 1, 1867.

Witnesses;
Thos. T. Parker
S. W. Wood

Inventor;
Thos. C. Moore,
Per. J. S. Brown.
Atty.

United States Patent Office.

THOMAS C. MOORE, OF WILMINGTON, OHIO.

Letters Patent No. 60,775, dated January 1, 1867.

---

IMPROVED SMOOTHING-IRON.

---

The Schedule referred to in these Letters Patent and making part of the same.

---

TO ALL WHOM IT MAY CONCERN:

Be it known that I, THOMAS C. MOORE, of Wilmington, in the county of Clinton, and State of Ohio, have invented an Improved Flat-Iron; and I do hereby declare that the following is a full and exact description thereof, reference being had to the accompanying drawings, making part of this specification—

Figure 1:
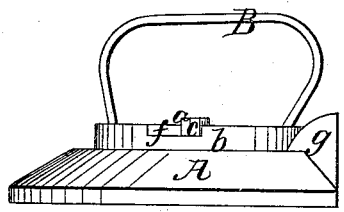

Figure 1 being a side view of a flat-iron constructed with my improvements.

Figure 2:
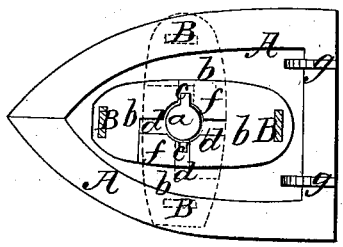

Figure 2, a top view thereof.

Figure 3:
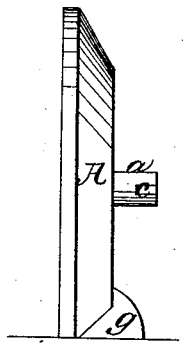

Figure 3, a side view of the flat-iron when standing on the back end, the handle being removed.

Like letters designate corresponding parts in all of the figures.

The object of my invention is to produce an improved means of coupling a removable handle to the flat-iron, so that the iron may be separated from the handle when heating, and the handle may be readily secured to it for using, thus always having a cool handle to work with.

The body, A, of the utensil may be of the usual form. It has a round pin, $a$, projecting upward from its centre. This pin has a projection, $c$, or, preferably, two projections, $c\ c$, at its upper end, as shown. The handle B has a base-plate, $b$, which is to rest on top of the body A, and has a round hole in its centre just large enough to receive the pin $a$ of the body, and a side notch or notches, $d\ d$, which will just admit the projections $c\ c$ of the pin $a$ when the handle is turned round crosswise, more or less, to the body, as shown by red lines in fig. 2; but when the handle is turned back to the proper position for use the projections $c\ c$ will move round in depressions, $f\ f$, in the upper side of the base piece $b$ of the handle, and hold the same securely in place. The sides of the depressions $f\ f$ serve as guides to keep the handle in right position. Thus, the operator only has to turn the handle round a quarter of a circle or less, and then separate it from the body after placing it in position for heating, and to reverse the movement for attaching again to the body for using the flat-iron. The body A has one or two heel projections, $g\ g$, at the back end, as shown, to enable it to stand up endwise, as seen in fig. 3, when the handle is detached.

What I claim as my invention, and desire to secure by Letters Patent, is—

The pin $a$, with its projections $c\ c$, on the body A of the flat-iron, in combination with the hole, and its side notches $d\ d$, in the handle B, substantially as and for the purpose herein specified.

I also claim the heel projections $g\ g$ in combination with the device for coupling the handle B to the body A, for the purpose set forth.

The above specification of my improved flat-iron signed by me this 18th day of September, 1866.

THOMAS C. MOORE.

Witnesses:
 H. E. MOORE,
 J. C. McMILLAN.